United States Patent
Trom et al.

[11] Patent Number: 5,362,025
[45] Date of Patent: Nov. 8, 1994

[54] PORTABLE COMPUTER SUPPORT DEVICE AND MEANS OF SUPPORT

[76] Inventors: Michael Trom, 4073 Beard Ave. N., Robbinsdale, Minn. 84094; Gregory Trom, Sandy, Utah

[21] Appl. No.: 898,525

[22] Filed: Jun. 15, 1992

[51] Int. Cl.⁵ ............................................. F16M 3/00
[52] U.S. Cl. ..................................... 248/670; 248/187; 248/917
[58] Field of Search ............... 248/917, 918, 919, 920, 248/921, 922, 924, 637, 671, 672, 675, 676, 678, 670, 682, 444, 177, 187, 163.2, 163.1

[56] References Cited

U.S. PATENT DOCUMENTS

| | | | |
|---|---|---|---|
| 4,453,689 | 6/1984 | Ellis et al. | 248/923 X |
| 4,570,887 | 2/1986 | Banister | 248/187 |
| 4,834,329 | 5/1989 | Delapp | 248/923 X |
| 4,852,830 | 8/1989 | Howard et al. | 248/921 X |
| 4,974,808 | 12/1990 | Ball | 248/917 |
| 5,040,760 | 8/1991 | Singer | 248/924 X |
| 5,098,053 | 3/1992 | Cotterill | 248/923 X |
| 5,136,772 | 8/1992 | Rupprecht et al. | 29/511 |

FOREIGN PATENT DOCUMENTS 2375846  9/1978  France ............... 248/670

Primary Examiner—Ramon O. Ramirez

[57] ABSTRACT

The present invention provides a apparatus for supporting portable personal computers atop tripods, pedestals, legs, stands, and similar devices comprising a base (10) having a fastener element (11) for securing said base to a support surface, and a plurality of support arm assemblies (14). Said means allows the computer to be operated atop tripods, pedestals, legs, stands, and similar devices, providing a stable, transportable, adjustable work station for using portable personal computers in non-traditional, remote and/or rugged environments.

7 Claims, 1 Drawing Sheet

PORTABLE COMPUTER SUPPORT DEVICE AND MEANS OF SUPPORT

BACKGROUND OF THE INVENTION

1. Field of the Invention

This invention relates in general to supports, and in particular to supports for use with portable personal computers, namely lap-top, notebook, pen-based, and similar computers. The present invention provides an apparatus for supporting portable personal computers atop tipods, pedestals, legs, stands, and similar devices without the need of work surfaces such as desks, table tops, counter tops, and laps for support; adding significantly to their utility in non-traditional, remote, and/or rugged environments. The present invention also provides a means for attaching portable personal computers to transportable stands such as tripods, pedestals, legs, etc., for the purpose of creating transportable work stations.

2. Prior Art

The advent of the personal computer has revolutionized both business and home life. In less than a decade, computers have moved from desk-top, to lap-top, and now finally to notebook, and pen-based. As computers have become more portable and more powerful, the number of possible applications has increased. Along with the increase of applications has come the need for using portable computers in new and different environments aside from just the traditional desk-top or office. Today, doctors, lawyers, therapists, engineers, architects, contractors, surveyors, salespeople, mechanics, and many others may find the need to use computers on the go and outside the traditional bounds of an office; away from desks, counters or table tops. In some instances, it may simply be that there isn't room on a desk, table, or counter to operate the computer.

To date, prior art has focused on desk-top personal computers and their keyboards, monitors or screens which sit, rest, lie or are otherwise supported on or between the intended work surface (desk, table, counter, lap, etc.). Such supports are not designed for computers such as portables including laptop, notebook, and palmtop computers. Additionally, said support adds utility to portable personal computers by allowing the work station to be transported, permitting operation of the computer in non-traditional remote and/or rugged environments.

Regardless of form, the function of prior art devices is simply to tilt the keyboard, monitor or screen for more comfortable typing or viewing. Prior art does nothing to accommodate the use of the computers with tripods, pedestals or legs for remote operation. Furthermore, they do nothing to address the issue of work surface transportability. The present invention is an improvement over prior art and addresses sited deficiencies with a device which adjusts to accommodate most small portable computers on the market today without the need of desks, tables, counters, adjoining surfaces, or laps.

In some instances, peripherals such as printers are supported by stands or support brackets, but again, these do not address the issue of transportable work surfaces, nor are they directly related to the portable personal computer itself.

Never has a means of attaching portable computers to tripods, pedestals, legs, stands or similar devices been devised allowing for the operation of portable personal computers without desks, table tops, counter tops, adjoining surfaces, or laps. No known support means, by which to accommodate the attaching of portable personal computers directly to tripods, pedestals, legs, stands and similar devices has been devised. Whatever the precise merits, features, and advantages of the prior art, none of them achieves or fulfills the purposes of the present invention.

SUMMARY OF THE INVENTION

The principal object of the present invention is to provide an apparatus for supporting personal portable computers atop tipods, pedestals, legs, stands, or similar devices. Furthermore, it is another purpose of the present invention to permit the computer's position to be adjusted to accommodate uneven, rugged, or sloping surfaces, and also adjust to working height, tilt, pitch and pivot while supported by the apparatus depicted in FIG. 1.

The foregoing objects of the present invention can be accomplished by providing a apparatus, comprising a base having a threaded annular aperture fastener and a plurality of support arms to universally fit the mounting apparatus on photographic or camcorder tripods, pedestals or similar stands. In the preferred embodiment of the invention, the device comprises base and a threaded annular aperture fastener, and a plurality of extensible support arms. The ends of each of the adjustable extensible support arm is pronged and plastic dipped to secure the corners of the computer to the base. An interlocking, mechanical fabric fastener is used to secure the computer to the invention by strapping across the top of the computer and attaching to each of the rear support arms below the computer.

Another object of the invention is preferably for the fastener to interface integrally or monolithically to the base of the computer housing or enclosure.

DESCRIPTION OF THE PREFERRED EMBODIMENTS

Figure 1:
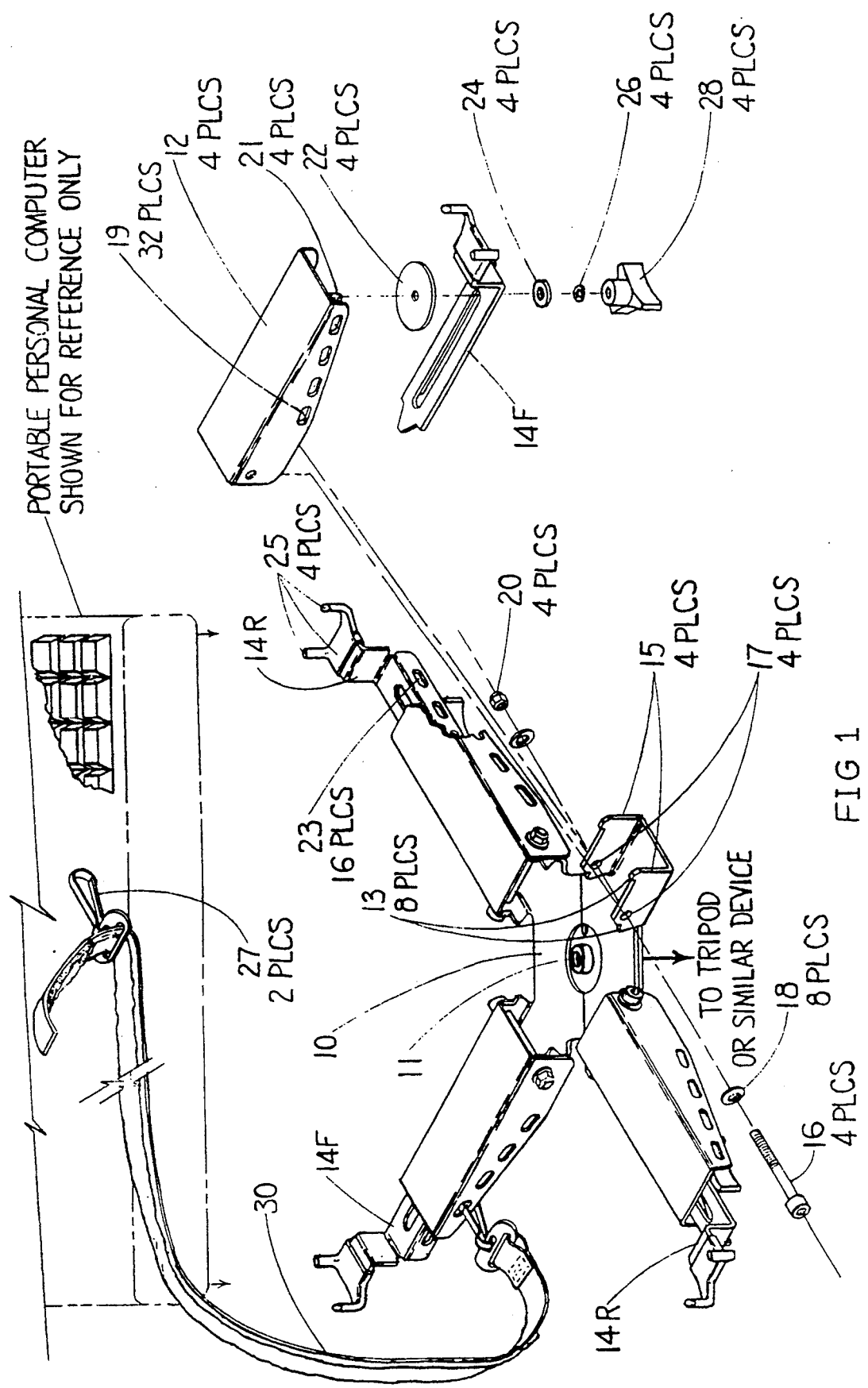
FIG. 1 is an exploded isometric view of a personal computer support in accordance with the present invention. The figure also includes an exploded view of a support arm assembly showing the swing arm, extender arm, and lock assembly.

As shown in the drawings, the preferred means for using portable personal computers without a desk, table, counter, or lap is accomplished by an apparatus comprising a threaded annular aperture fastener and a plurality of support arms. Said apparatus supports and secures the computer atop tripods, pedestals, legs, stands, and similar devices. A support device comprising a threaded annular aperture fastener and a plurality of support arms is depicted in FIG. 1. The device in FIG. 1 comprises five main components:

1. The weldment base (10) which preferably is metallic (aluminum); stamped, formed, and spotwelded with a "pressed in" threaded, preferably female, annular aperture fastener (11) which will adapt to the mounting apparatus on all standard photographic and camcorder tripods and similar stand devices. The base bears four sets of vertical stop-tabs (15) which provide four pressure/friction pivot mounting points (17) as well as "up position, down position stops" (13) for each of four swing arm members (12) which are connected to said base via four bolt assemblies (16, 18, 20).

2. The four swing arms (12) are preferably metallic (steel), stamped and formed with a row of slots (19) running lengthwise on each side to provide connection points for the safety strap (30). On each swing arm (12), a "pressed in" threaded stud (21) provides a pivot and clamping point for the four extender arms (14).

3. The four (4) extender arms (14) are preferably metallic (aluminum), stamped and formed, each with a single row of slots (23) running lengthwise on the part which provides additional safety strap hook mounting points when the device is used with arms extended. At the end of each extender arm (14) is a raised surface and two vertical posts (25) which serve as the interface between the support arm assembly (12, 14), and the four bottom corners of the computer to which the device is fitted. The extender arms (14) move in and out from under the swing arms (12), as well as pivot, in order to accommodate computers of different sizes and different length and width ratios. The use of steel and aluminum in the support arm assembly (12, 14) components promotes a low coefficient of friction between the respective parts in the area of contact. The raised surface and vertical posts (25) are preferably plastic dipped to provide non-skid, non-marring contact points on the computer sides or base.

4. Clamp knob assembly (22, 24, 26, 28) via said "pressed in" threaded stud (21) lock the extender arms (14) in desired settings in place against the swing arms (12). An elastomer pad (22) between each extender arm (14) and the swing arm (12) provide the necessary holding friction at the clamp point between these two parts. The invention is configured so that in its normal operating position, the arm centerlines radiate from the approximate center of the weldment base (10) on the (imagined) corner to corner centerlines of an 8½ inch by 11 inch rectangle, centered on the threaded annular aperture fastener (11).

5. A safety assembly (30) preferably a Velcro strap is extended across the top of the mounted computer and the strap hooks (27) are positioned in the most suitable aforementioned slots in the extender arms (14) or swing arms (12). The strap length is preferably fully adjustable.

The invention may be collapsed for ease of transport while maintaining its size adjustment setting. Materials of construction can vary depending upon suitability without departing from the spirit of the present invention. In addition, the support arm assemblies (12, 14) need not be made to allow folding or collapsing.

The present invention may also interface integral with the computer housing. Such means of attaching a computer to a support surface would comprise a threaded annular aperture fastener (11) element built integrally or monolithically into the base of the computer housing itself which attaches to tripod surface connecting means eliminating the need for support arms and related components (12, 14).

The present invention, when used in combination with tripods, pedestals, legs, stands, and similar devices provides a means for operating said computers without the need for desks, tables, counters, laps, and other traditional work surfaces; adding significantly their utility in non-traditional, remote, and/or rugged environments and allows portable personal computers to be joined to transportable stands for the purpose of creating transportable work stations.

While the invention has been described with reference to certain preferred embodiments thereof, those skilled in the art will appreciate that various changes and modifications and substitutions can be made without departing from the spirit of the invention. It is intended therefore, that the invention will be limited only by the scope of the claims which follow.

What is claimed is:

1. An apparatus for supporting portable computers on top of tipods, pedestals, legs and stands comprising a base having a threaded annular aperture fastener element for securing said base to a support surface connecting means, and a plurality of support arm assemblies secured to said connecting means.

2. A support apparatus in accordance with claim 1, wherein said arm assemblies comprise pivotally swinging arm and extender connected to said swinging arms.

3. A support apparatus in accordance with claim 2, comprising a lock assembly (22,24,26,28) for locking or fixing extender arm settings.

4. A support apparatus in accordance with claim 2, comprising a safety assembly (30) suitable for securing computer to the support apparatus.

5. A support apparatus in accordance with claim 2, which when attached to tripods, pedestals, legs, stands or similar devices via said threaded annular aperture (11), acts as a stable and transportable work station for potable computer operation.

6. A support apparatus in accordance with claim 2, which can be folded at a vertical lab (15) between the base (10) and the support arm assemblies (12,14), collapsed or broken down at the threaded stud (21) of the swing arm (12) and extender arm (14) for ease of transport and storage.

7. A support apparatus in accordance with claim 2, which adjusts to fit a range of shapes and sizes of small lap-top, notebook, pen-based, and other small personal computers by lateral adjustment of a extender art/swing arm threaded stud (21).

* * * * *